United States Patent [19]

Pleasance et al.

[11] 4,210,877
[45] Jul. 1, 1980

[54] SPLIT GROUND STATE ATOMIC IODINE OR BROMINE LASER

[75] Inventors: Lyn D. Pleasance, Allegheny County; Ernest P. Riedel, Westmoreland County; Lelland A C. Weaver, Allegheny County, all of Pa.

[73] Assignee: Westinghouse Electric Corp., Pittsburgh, Pa.

[21] Appl. No.: 927,306

[22] Filed: Jul. 24, 1978

Related U.S. Application Data

[63] Continuation of Ser. No. 759,504, Jan. 14, 1977, abandoned, which is a continuation of Ser. No. 577,954, May 15, 1975, abandoned.

[51] Int. Cl.$^2$ ............................................. H01S 3/09
[52] U.S. Cl. ......................... 331/94.5 PE; 331/94.5 G
[58] Field of Search ................... 331/94.5 G, 94.5 PE; 330/4.3

[56] References Cited

U.S. PATENT DOCUMENTS

| | | | |
|---|---|---|---|
| 3,641,454 | 2/1972 | Krawetz | 331/94.5 G |
| 3,676,797 | 7/1972 | Kovacs | 331/94.5 G |

OTHER PUBLICATIONS

N. G. Basov et al, "Iodine Laser Emitting Short Pulses of 50 J Energy and 5 nsec. Duration," Sov. J. Quant. Electron. vol. 3, No. 6, May–Jun. 1974.
"More Laser Power with Electron-Beam Control", *Physics Today*, Jan. 1972, pp. 17–19.
"Atomic-Iodine Contender for Fusion Delivers 1.2 Gw in 10-nsec. Pulses", *Laser Focus*, Jul. 1972, pp. 24 and 26.

*Primary Examiner*—James W. Davie
*Attorney, Agent, or Firm*—M. P. Lynch

[57] ABSTRACT

An atomic iodine laser based on the electrical dissociation of $CF_3I$ in a gas mixture produces excited atomic iodine in the upper level of its split ground state which subsequently lases at 1.315 micrometers to the lower-level of its split ground state. The two level atomic iodine laser process excited by the electrical dissociation of $CF_3I$ or other alkyl-mono-iodides or perfluro-alkyl-monoiodides is efficient and suitable for high average power levels for application in isotope separation, fusion and weapons systems. Bromides may be substituted for the iodines to provide a two level atomic bromine laser which lases at 2.714 micrometers.

9 Claims, 15 Drawing Figures

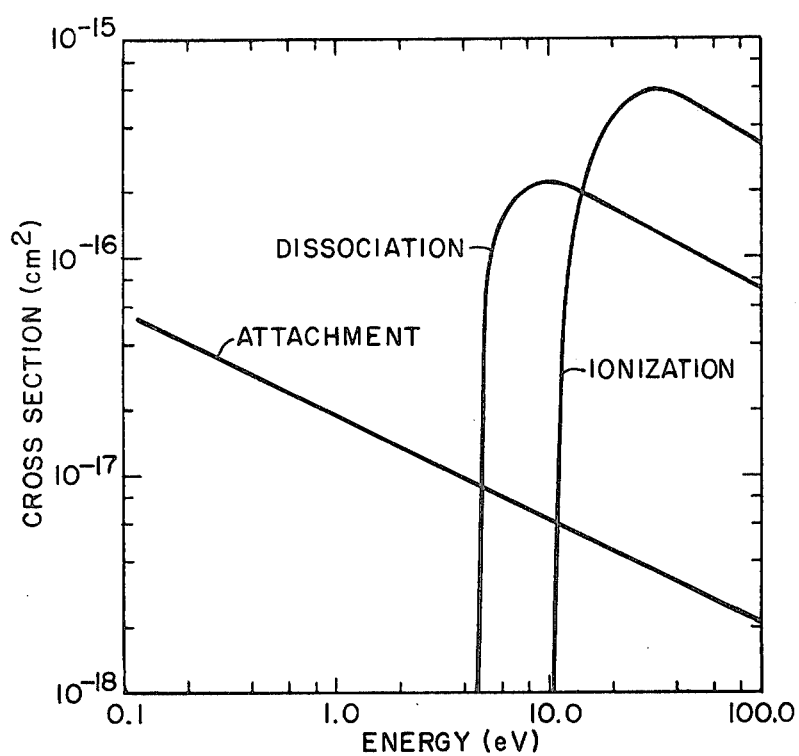
FIG. IC
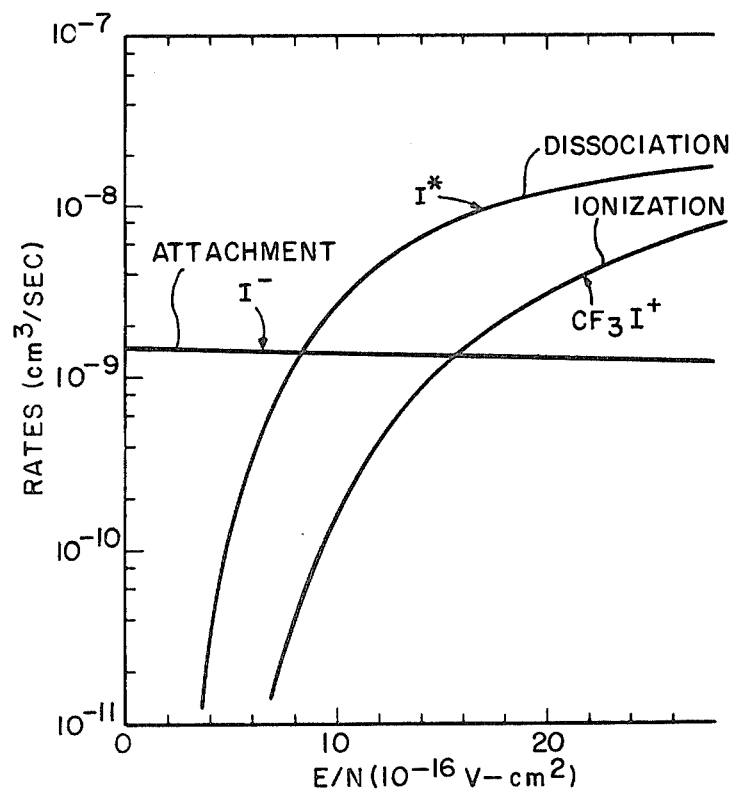
FIG. ID

SPLIT GROUND STATE ATOMIC IODINE OR BROMINE LASER

BACKGROUND OF THE INVENTION

1. Acknowledgment of Government Contract

The invention herein described was made in the course of or under a contract with the Department of the Air Force.

This is a continuation of application Ser. No. 759,504, filed Jan. 14, 1977, now abandoned, which is a continuation of Ser. No. 577,954, filed May 15, 1975, now abandoned.

2. Field of the Invention

This invention relates to halogen atom lasers by electrical excitation, particularly to an atomic iodine or bromine laser excited by electrical dissociation.

3. Description of the Prior Art

The ground state of atomic iodine is split by spin-orbit coupling into two states separated by 0.94 electron volts. Optical transitions between these two states are highly forbidden. A small cross-section for stimulated emission and small collisional deactivation rates make this transition suitable for a laser medium with high energy storage. Laser emission between these two ground state levels by UV flash photolysis of $CH_3I$ and $CF_3I$ was reported by J. V. V. Kasper and G. C. Pimentel, Applied Physics Letters 5, 231 (1964). Subsequently, iodine laser emission has been generated by flash photolysis of other alkyl-mono-iodides and perfluro-alkyl-mono-iodides such as $C_2H_5I$, $C_3H_7I$, $C_4H_9I$, $C_2F_5I$, $C_3F_7I$ as reported by J. V. V. Kasper, J. H. Parker, and G. C. Pimentel, Journal of Chemical Physics 43, 1827 (1965). Laser emission between the analogous states of bromine excited by flash photolysis of $CF_3Br$ was reported by J. D. Campbell and J. V. V. Kasper, Chemical Physics Letters 10, 436 (1971). Since the original discovery, the principal processes responsible for production and loss of the laser inversion had been investigated and identified for $CF_3I$ as:

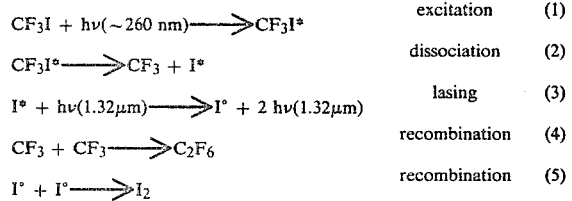

| | | |
|---|---|---|
| $CF_3I + h\nu(\sim 260\ nm) \longrightarrow CF_3I^*$ | excitation | (1) |
| $CF_3I^* \longrightarrow CF_3 + I^*$ | dissociation | (2) |
| $I^* + h\nu(1.32\mu m) \longrightarrow I^\circ + 2\ h\nu(1.32\mu m)$ | lasing | (3) |
| $CF_3 + CF_3 \longrightarrow C_2F_6$ | recombination | (4) |
| $I^\circ + I^\circ \longrightarrow I_2$ | recombination | (5) |

Absorption by $CF_3I$ of an ultraviolet photon at wavelength $\sim 260$ nm causes a transition to an excited state of $CF_3I$. This energy state is repulsive or weakly bound and subsequently dissociates into a $CF_3$ radical and atomic iodine. A portion of the atomic iodine is produced in the higher energy $I(^2P_{\frac{1}{2}})$ state of the split ground state of atomic iodine (denoted as $I^*$). Laser emission occurs at 1.3152 $\mu m$ by transition from the $I(^2P_{\frac{1}{2}})$ state to the lower energy $I(^2P_{3/2})$ state (denoted by $I^\circ$). The atomic iodine and $CF_3$ radicals ultimately recombine by formation of $C_2F_6$ or formation of $I_2$. The investigation of secondary or competing processes within this general framework is a subject of active research at the present time. The most extensive work has been done using $CF_3I$ and $C_3F_7I$. However, the processes defined by Equations 1-5 apply generally to lasers using any of the previously mentioned alkyl- or perfluro-alkyl-mono-iodides or bromides. Iodine lasers based on Equations 1 through 5 and excited by flash lamps are presently under construction at output energies of a few kilojoules.

The excitation of a high average power laser by photodissociation using flash lamps has several limitations. First, the generation of ultraviolet radiation by flash lamps is considered inefficient. The volume of the electrical discharge in the flash lamps is small when compared to the volume of the laser medium. Therefore, operation of a high average power laser by photodissociation requires a high power density in the flash lamp discharge. The reliability and lifetime of flash lamps decreases as the average power density dissipated in the flash lamp increases. Second, laser excitation takes place preferentially near the source of ultraviolet radiation, i.e. the flash lamp. As each ultraviolet photon is absorbed, fewer remain to penetrate further into the laser medium. Thus, the volume of laser medium excited by a flash lamp is limited. In addition, the spatial gradients which are created by the non-uniform excitation leads to a deterioration in the quality of the laser beam.

The limitations are associated with the localized nature of flash lamp excitation. These limitations are alleviated if the dissociation process leading to laser emission were distributed more or less uniformly over the volume of the laser medium. Excitation of the laser medium by means of an extended, diffuse electrical discharge within the laser medium itself is a solution to the problems associated with flash lamp excitation.

The feasibility of scaling is important in distinguishing the type and configuration of the electrical discharge which is compatible with high average power excitation of a dissociation laser. If a substantially uniform electrical discharge can be created for which the production and loss processes for charged particles and the energy balance of the electrons is determined within the bulk of the discharge by local effects and is insensitive to the processes near the edge of the discharge, the discharge can, in principle, be extended or 'scaled' in volume and operating density to limits set by external constraints. Examples of such discharges which display this characteristic and are in current use for excitation of other types of lasers, specifically nitrogen-carbon dioxide laser, are the self-sustained discharge between planar electrodes initiated by ultraviolet photons as described by L. J. Denes and L. A. C. Weaver reported in the Journal of Applied Physics 44, 4125 (1973), and the electron beam sustained discharge as described by Barton Krawetz in U.S. Pat. No. 3,641,454. The means for producing a volume scalable discharge under the conditions required for high power laser operation by dissociation of the mono-iodides and mono-bromides is one aspect of this invention.

In the prior art there exists a large body of knowledge concerning electrical discharges in which the dominant loss process for charged particles is diffusion to nearby walls. Such discharges operate in a stable, diffuse mode in a number of gases with both pulsed and continuous electrical operation at pressures of gas of a few tens of Torr or less. Attempts to increase the gas density, to increase the volume of the discharge for constant local parameters by extending the separation of the walls, or changing the configuration of the walls to be compatible with high speed convective flow result in the formation of constricted arcs in the discharge. Similar constrictions are observed to occur when fractional amounts by density of a gas which forms negative ions by attachment of electrons are added to an otherwise stable discharge in a buffer gas. Similar behavior is observed to occur in electrical discharges in attaching gases alone at pressures substantially lower than would be observed in non-attaching gases. Compounds containing the halides are among the strongest of the attaching gases. This type of discharge is not scalable to operation at high average power levels.

Laser emission has been observed from electronic levels of atomic species produced in these electrical discharges. An example is the atomic fluorine laser disclosed in U.S. Pat. No. 3,676,797 issued to M. A. Kovaks. A gas mixture of helium at a partial pressure of between 2 and 10 Torr and $CF_4$ at partial pressures between 0.01 and 0.1 Torr is excited in a cylindrical discharge tube. The laser transitions referred to in the patent occur between electronic levels with energies well above the energy of ground electronic state of the atomic fluorine. Since the energy required to excite these high lying electronic levels is large compared to the energy of the laser photon, these transitions are judged inherently inefficient. Similar laser transitions have been observed between high lying electronic levels of atomic iodine as reported by R. C. Jensen and G. R. Fowles in the IEEE Journal of Quantum Electronics, 52, 1350 (1964). These transitions are not suitable for development as a high average power laser.

SUMMARY OF THE INVENTION

The present invention is the first observation and demonstration of laser emission between the $^2P_{\frac{1}{2}}$ and $^2P_{3/2}$ levels of the ground electronic state of atomic iodine excited by dissociation in an electrical discharge. In addition this invention was made using an electrical discharge configuration which is scalable in operating pressure and volume and is compatible with heat removal by rapid convective flow. The invention of the $I(^2P_{\frac{1}{2}})$ to $I(^2P_{3/2})$ laser transition with a scalable electrical discharge represents an advance in the state of the art over previous combinations.

A method and apparatus is provided for inducing population inversion in a gaseous mixture of $CF_3I$ and $N_2$ or other suitable buffer gas by the dissociation of $CF_3I$ by volumetric electrical discharges to raise atomic iodine upon dissociation from $CF_3I$ above its lowest electronic ground state to a second electronic ground state separated by 0.94 electron volts. Other alkyl-mono-iodides, perfluro-alkyl-mono-iodides, alkyl-mono-bromides or perfluro-alkyl-mono-bromides may be used in place of $CF_3I$.

BRIEF DESCRIPTION OF THE DRAWINGS

FIG. 1C is a set of curves showing an estimate of the cross-sections for attachment, dissociation and ionization in $CF_3I$ as a function of electron energy;

FIG. 1D is a set of curves showing an estimate for the rates of attachment, dissociation and ionization of fractional amounts of $CF_3I$ in $N_2$ as a function of E/N, the ratio of electric field to total gas density;

DESCRIPTION OF THE PREFERRED EMBODIMENTS

Figure 1A:
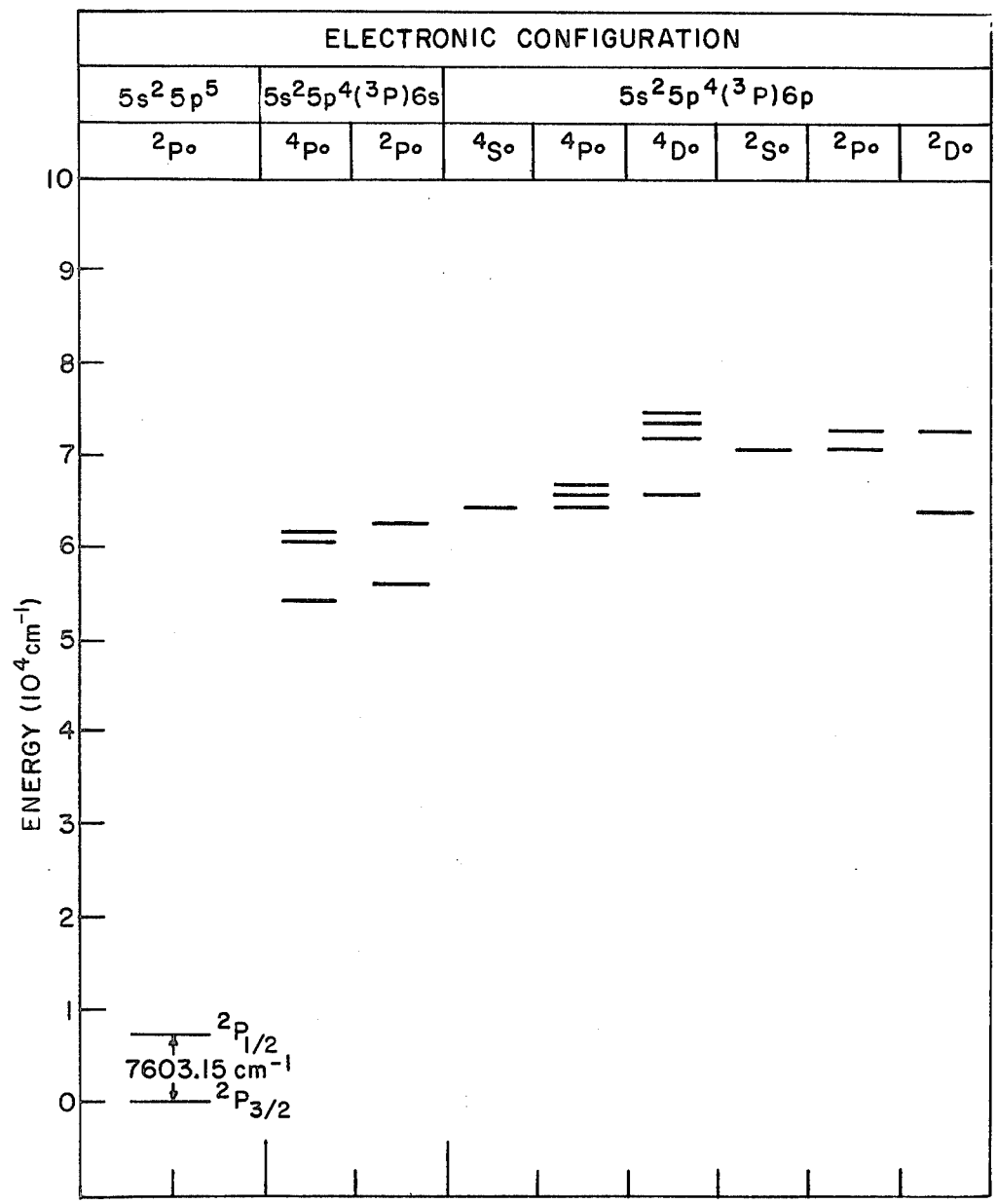
FIG. 1A shows a partial energy level diagram for atomic iodine.

In the present invention, there is produced a population inversion leading to laser emission in atomic iodine or atomic bromine produced by dissociation by electron impact of a mono-iodo or mono-bromo gas in an electrical discharge. The reaction which produces the mono-iodide or mono-bromide in the upper laser level may be written as follows:

$$C_nY_{2n+1}X + e^- \longrightarrow C_nY_{2n+1} + X^* \qquad \text{excitation} \qquad (6)$$

where Y is hydrogen (H) and/or fluorine (F), X is either iodine (I) or bromine (Br) and n is 1, 2, 3 or 4. It should be apparent from the formula that suitable gases include mono-iodo and mono-bromo substituted alkanes containing up to four carbon atoms. Also suitable are the analogous compounds wherein fluorine (F) is substituted for all of the remaining hydrogens on the aforesaid alkanes. With the higher homologues (i.e. where n=3 or 4), it is preferred for the X to be attached to a primary carbon atom, as the radicals provided therefrom appear to recombine more readily. The other position isomers, with X attached to either secondary or tertiary carbons, are operable, however. Suitable gases include $CF_3I$, $C_2F_5I$, $C_3F_7I$, $C_4F_9I$, $CF_3Br$, $C_2F_5Br$, $C_3F_7Br$, $C_4F_9Br$, $CH_3I$, $C_2H_5I$, $C_3H_7I$, $C_4H_9I$, $CH_3Br$, $C_2H_5Br$, $C_3H_7Br$, $C_4H_9Br$ and $CF_3CH_2I$. $e^-$ is an electron with the appropriate kinetic energy produced in an electrical discharge, $C_nY_{2n+1}$ is the radical produced by the dissociation, $X^*$ is the higher energy state of the ground electronic configuration of the appropriate atomic halide produced by dissociation such as $I(5s^25p^5\ 2P°_{\frac{1}{2}})$ denoted $I(^2P_{\frac{1}{2}})$, or $Br(4s^24p^5\ 2P°_{\frac{1}{2}})$ denoted $Br(^2P_{\frac{1}{2}})$. Lasing takes place by a transition between this upper electronic level of $X^*$ and the lower level of the ground electronic configuration of X designated $I(5s^25p^5\ 2P°_{3/2})$, $Br(4s^24p^5\ 2P°_{3/2})$, as is appropriate. The laser wavelength for this transition for iodine is 1.3152 micrometers and for bromine is 2.714 μm.

One example of the above laser process is the dissociation of $CF_3I$ in a volume electrical discharge to form atomic iodine in the $I(^2P_{1/2})$ state.

$$CF_3I + e^- \longrightarrow CF_3 + I(^2P_{1/2}) + e^- \quad \text{excitation} \quad (7)$$

$$I(^2P_{1/2}) + h\nu(1.32\mu m) \longrightarrow I(^2P_{3/2}) + 2\,h\nu(1.32\mu m) \quad \text{lasing} \quad (8)$$

The $CF_3I$ is dissociated by an inelastic collision with an electron in an electric discharge. One of the fragments appears as excited atomic iodine in the $I(^2P_{1/2})$ state. The atomic iodine in the $I(^2P_{1/2})$ state decays slowly by collisional processes. Laser emission results from transitions between the $I(^2P_{1/2})$ state to the $I(^2P_{3/2})$ state.

There are several mechanisms which could be responsible for production of excited atomic iodine in the $I(^2P_{1/2})$ state in an electrical discharge. Present evidence suggests that the following mechanism is responsible:

$$CF_3I + e^- \rightarrow CF_3I^* \quad (9)$$

$$CF_3I^* \rightarrow CF_3 + I(^2P_{1/2}) \quad (10)$$

The $CF_3I$ is excited to one of its electronic states denoted by $CF_3I^*$ by an inelastic collision with an electron of appropriate energy in the discharge. The $CF_3I^*$ subsequently dissociates into the $CF_3$ radical and $I(^2P_{1/2})$.

An additional element in the process which leads to the formation or enhancement of a population inversion is a mechanism to rapidly remove any population in the lower laser level which is produced during the discharge pulse. A population inversion need not be produced during the period of the discharge pulse if the rate of removal of the population of the lower laser level is faster than the decay of the upper laser level. Such a mechanism would be:

$$I(^2P_{3/2}) + CF_3 \longrightarrow CF_3I^+ \quad \text{recombination} \quad (11)$$

where $I(^2P_{3/2})$ is the lower laser level and $CF_3I^+$ is a vibrationally excited level of the ground state of $CF_3I$. The $C_nY_{2n+1}$ radical which is necessary for the recombination process and the excited iodine ($I^*$) may also be derived from separate gases. For example, the $C_nY_{2n+1}$ may be produced by the dissociation of $CF_3N_2$:

$$CF_3N_2 + e^- \rightarrow CF_3 + N_2 \quad (12)$$

The $I^*$ may be produced by the dissociation of HI:

$$HI + e^- \rightarrow I^* \quad (13)$$

$$HI + e^- \rightarrow I^\circ \quad (14)$$

For this example, the population inversion should be:

$$I^* > I^\circ/2 \quad (15)$$

The other products of dissociation must be selected so that they do not interfere with the excited iodine.

FIG. 1A shows an energy level diagram for atomic iodine showing the relationship of the $I(^2P_{1/2})$ and $I(^2P_{3/2})$ levels of the $5s^25p^5$ ground electronic configuration to higher energy levels of different electronic configurations. A similar energy level diagram exists for atomic bromine for the relationship of the $Br(^2P_{1/2})$ and $Br(^2P_{3/2})$ levels of the $4s^24p^5$ ground electronic configuration to higher energy levels of different electronic configurations.

Figure 1B:
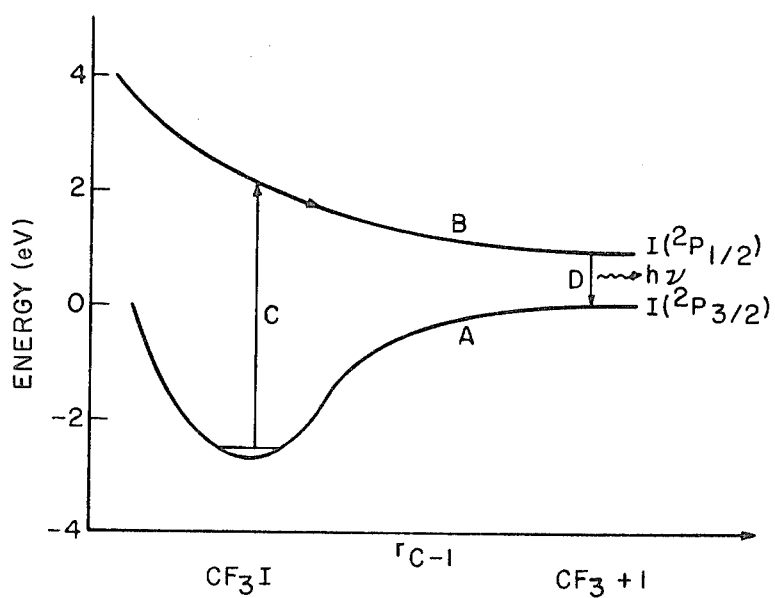
FIG. 1B is an energy diagram showing the split ground state of iodine.

FIG. 1B shows an energy level of a $CF_3I$ molecule for its ground state and for its excited state as a function of dissociation or atomic distance of I from $CF_3$ designated $r_{C-I}$. FIG. 1B shows the energy levels schematically and is not necessarily complete. A $CF_3I$ molecule in the ground state may be raised to the excited state by an electron collision imparting energy to the molecule or by electron exchange processes where the molecule may absorb one electron and emit another with the net increase of energy raising the molecule to the excited state as shown by the arrow C in FIG. 1B. The excited molecule subsequently dissociates forming excited iodine. The inelastic collisions with the $CF_3I$ molecule are produced during a volumetric electrical discharge. The energy distribution of the electrons in the electrical discharge is broad, extending from low energies to above the ionization energy of iodine. If a buffer gas such as nitrogen is used and only small amounts of $CF_3I$ are added to form a mixture of $CF_3I$ and nitrogen, the energy distribution of the electrons in the gas mixture in the electrical discharge may be approximated by a discharge in nitrogen and determined from available literature. A major competing process to the excitation of $CF_3I$ which occurs simultaneously is the dissociative attachment of electrons to form negative ions designated by $I^-$. The ground state of $CF_3I$ rather than being excited simply dissociates in the ground state and forms $CF_3$ and the negative ion $I^-$. A second major process which competes with the process of exciting $CF_3I$ is the ionization of $CF_3I$.

The electron collision cross-sections for attachment, dissociation, and ionization of $CF_3I$ are largely unknown. An estimate for the electron collision cross-sections for attachment, dissociation and ionization in $CF_3I$ is shown in FIG. 1C. The cross-section is shown as function of the electron energy and electron volts. The rates for ionization, attachment and dissociation of $CF_3I$ and for the ionization of $N_2$ were calculated by integrating over the electron energy distribution function of an electron discharge in $N_2$. FIG. 1D shows an estimate of the rates for attachment, dissociation and ionization of $CF_3I$ in molecular nitrogen $N_2$ as a function of E/N where E is the electric field and N is the total gas density. As shown in FIG. 1D, the large dissociation rates require operation of the discharge at high values of E/N in the regime where ionization rates are appreciable.

Figure 2A:
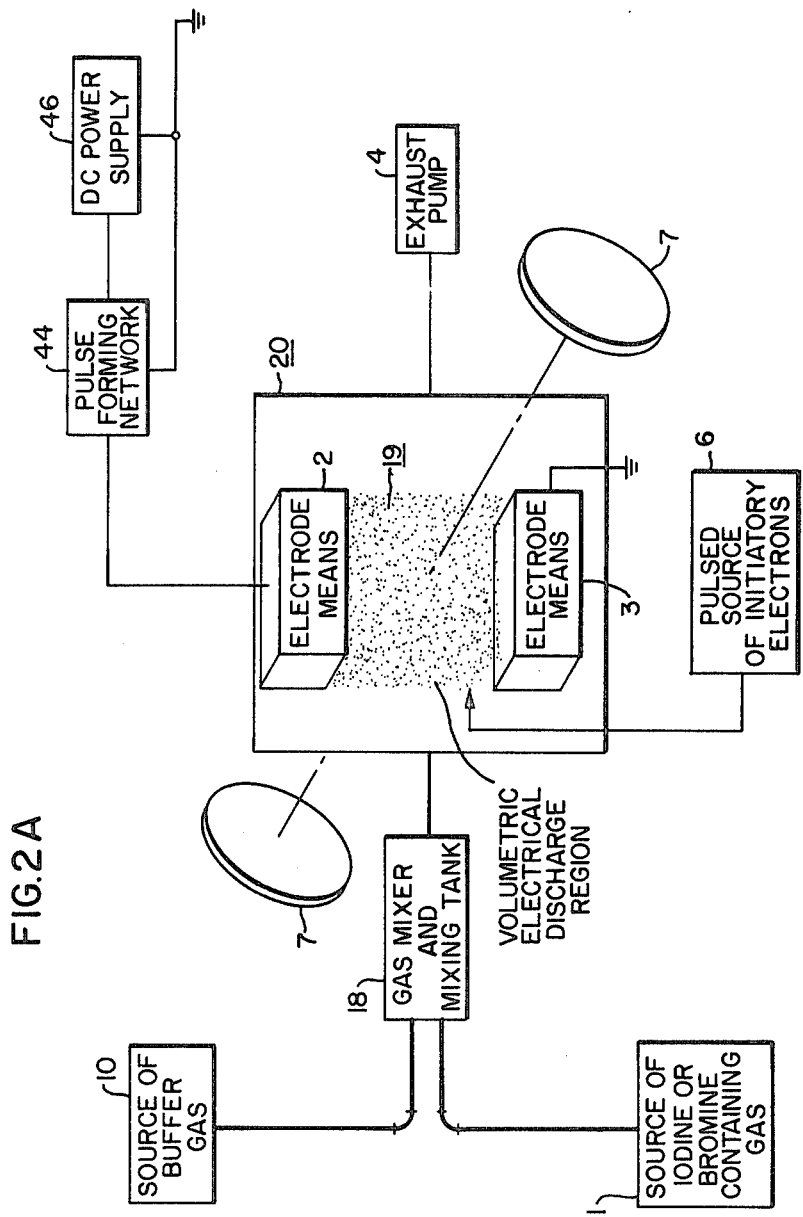
FIG. 2A is a simplified diagram showing the relationship of the physical elements of this invention.

An embodiment of the invention is schematically depicted in FIG. 2A. Referring now to FIG. 2A, a source of mono-iodide or mono-bromide gas 1 and a source of buffer gas 10 are provided to gas mixer 18 where the gases are intimately mixed into a flowing stream. The gas stream flows into enclosure 20 and between electrode means 2 and 3 before being removed from enclosure 20 by exhaust pump 4. A DC power supply 46 and a pulse forming network 44 provide the source of energy to electrode means 2 and 3. A pulse source of initiatory electrons 6 provides free electrons to the volume of gas in the region between electrode means 2 and 3. Electrode means 2 and 3 with DC power supply 46, pulse forming network 44 and a source of initiatory electrons 6 provide a volumetric electrical discharge in the region between the electrode means 2 and 3. Optic means 7, not completely shown, is provided for stimulating emission of radiation from the mixture of gases flowing from gas mixer 18.

Figure 2B:
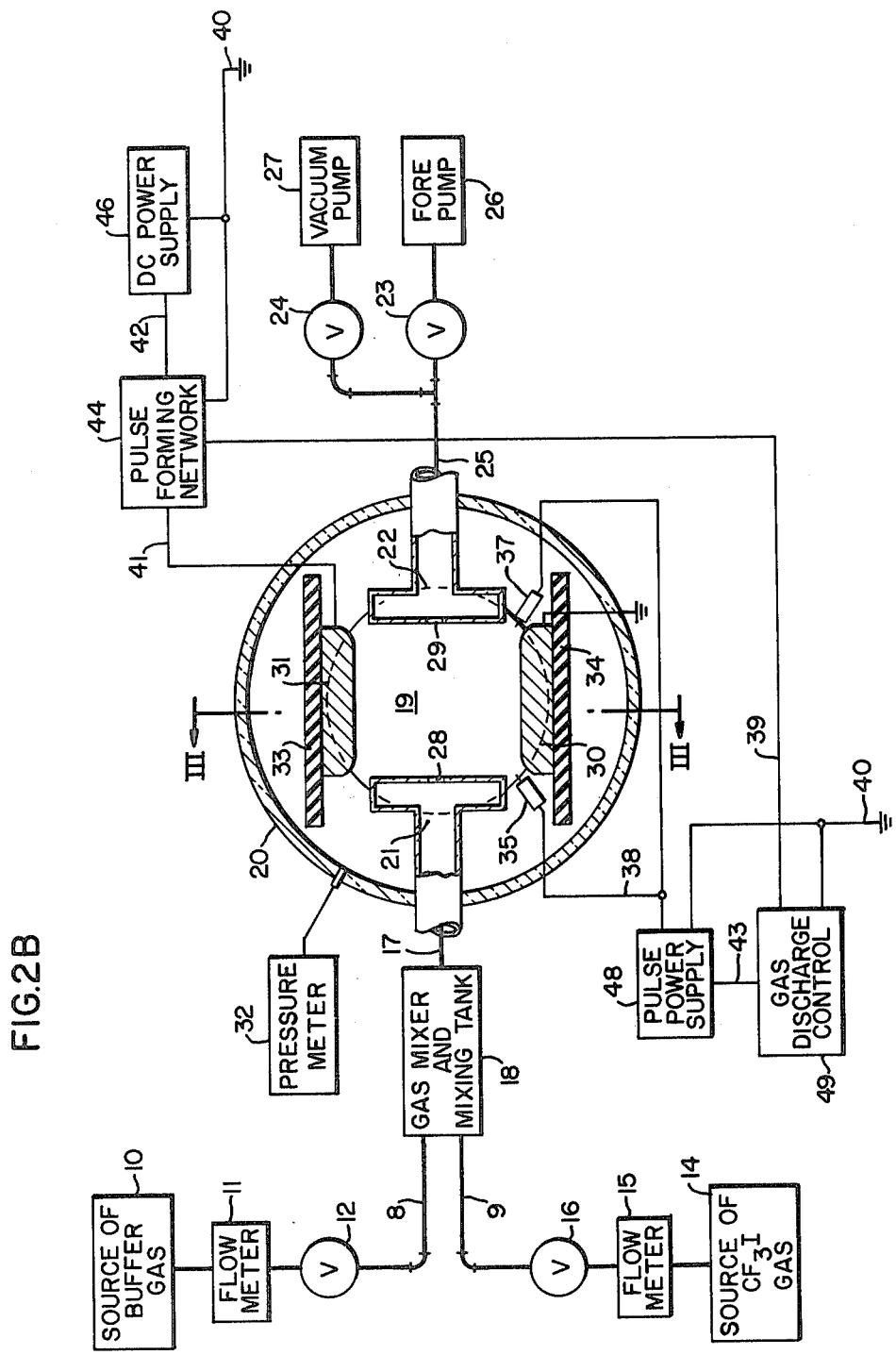
FIG. 2B is a simplified diagram of a laser system which provides laser energy in accordance with the present invention.
Figure 3:
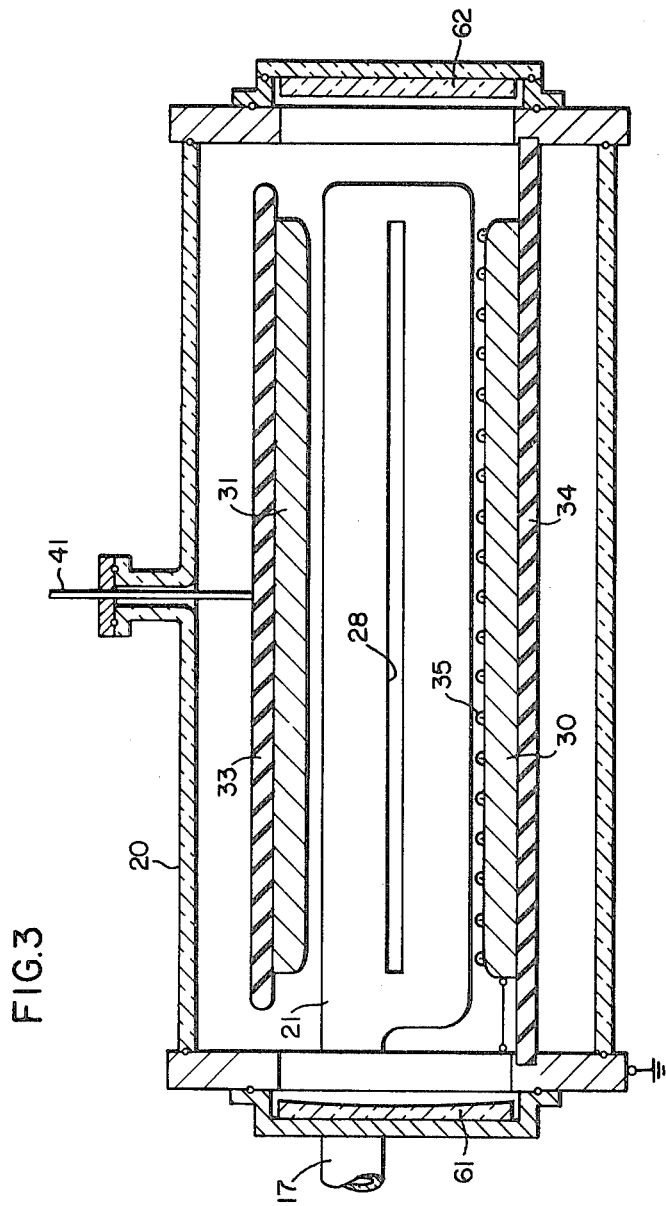
FIG. 3 is a cross-section of the laser system of FIG. 2B taken on the line III—III.

An example of the apparatus used to produce the atomic iodine laser in accordance with the present invention is shown in FIGS. 2B and 3. A source of inert buffer gas 10 passes through flow meter 11 and valve 12 into the gas mixer and mixing tank 18. A suitable buffer gas is one which does not react with the other gas constituents chemically and which provides suitable characteristics for electrical discharges. Examples of a suitable gas are helium, argon, krypton, xenon, and molecular nitrogen, alone or in combination. A source of $CF_3I$ gas 14 passes through flow meter 15 and valve 16 into the gas mixer and mixing tank 18. The $CF_3I$ gas is the chemical which dissociates to produce the atomic iodine which emits laser radiation. Other gases may be added in small amounts to the $CF_3I$ gas to modify the discharge characteristics to provide advantageous chemical reactions during and after the electrical discharge pulse. The gas mixer and mixing tank 18 provide a means of mixing the two gas streams from valve 16 and valve 12 so that they form a uniform or homogeneous distribution through the gas mixture even though the molecular weight of the $CF_3I$ gas may be much larger than the molecular weight of the buffer gas, and the amount of $CF_3I$ gas may be in a small proportion to the buffer gas used.

Figure 4:
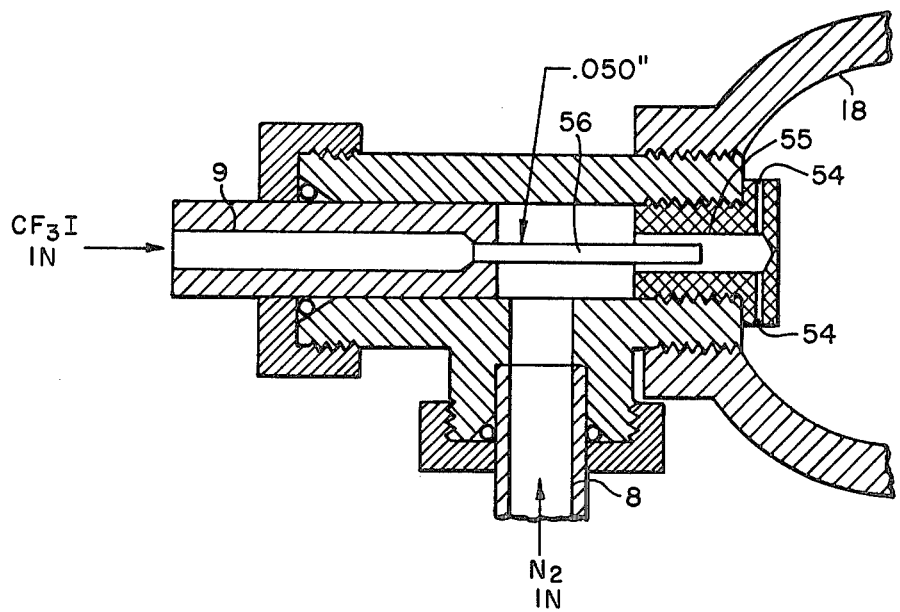
FIG. 4 is a detail drawing of a gas mixer assembly.

An example of the device to accomplish mixer 18 is shown in FIG. 4 which shows the inlet duct 8 for the buffer gas which passes through a constricted annular tube 55 at sufficient velocity to establish turbulent flow. The $CF_3I$ gas is added to this flow from duct 9 through a 0.127 cm. tube 56. The $CF_3I$ and buffer gases then pass through an array of small holes 54 before entering into a ten liter mixing tank 18 which is partially shown. The $CF_3I$ and buffer gas flow rates are measured by flow meters 15 and 11, respectively, with inlet pressures near one atmosphere, and the pressure of the two gas streams may be adjusted to approximately 150 Torr before entering the mixer 18.

The gas mixture exiting from the gas mixer and mixing tank 18 passes toward the electrodes 30 and 31 through inlet duct 17 and channel 21. The gas mixture or laser medium 19 passes into the discharge region or the region between the electrodes 30 and 31 through an opening 28 in the channel 21. The laser medium 19 exiting from channel 21 is contained by gas enclosure 20. The laser medium 19 flows toward opening 29 in channel 22 and through outlet duct 25. A uniform flow of laser medium 19 flows through the region of the electrical discharge and between the electrodes 30 and 31 to supply fresh gas to the electrode region. The flow of laser medium 19 is to stabilize the electrical discharge and to insure that species produced by the electrical discharge do not degrade the laser emission. The flow may be directed transverse to the electrodes in the direction along the length of the electrodes, transverse to the electrodes in the direction across the electrodes or through the surface of the electrodes in the direction of the electrical discharge. The first two gas flows are preferred.

Laser medium 19 in the outlet duct 25 may pass through valve 23 through a fore pump 26. The fore pump 26 produces a uniform flow of gas in the system. The gas enclosure 20 is initially evacuated before laser medium 19 is let into the enclosure. Vacuum pump 27 with valve 24 opened and valves 23, 16 and 12 closed, enables the gas enclosure 20 to be evacuated. Subsequent to evacuation of gas enclosure 20 the laser medium 19 is allowed to flow through inlet duct 17 through the gas enclosure 20 and the outlet duct 25 through valve 23 and out through the fore pump 26.

The excitation of the laser medium 19 leading to the decomposition or dissociation of $CF_3I$ to form atomic iodine in the excited ground state is provided by volumetric electrical discharges between electrodes 30 and 31. An example of suitable electrodes are electrodes formed to a modified Bruce profile to provide a uniform electric field. A description of the profile is disclosed by F. M. Bruce in J. Inst. Electr. Eng. 94, 139 (1947). The flat area of each electrode is, by way of example, two centimeters by 50 centimeters and the electrode spacing is two centimeters. To insure a uniform current distribution in the discharge region between the electrodes, the gas is pre-ionized or supplied with free electrons by ultraviolet radiation from separately excited electric arcs arranged along the edge of the lower electrode (the anode), emanating from a row of resistors 35 and 37. The row of resistors 35 and 37 are energized by lead 38 which is connected to pulse power supply 48. The anode 30 is connected to ground lead 40 which is connected to the pulse power supply 48. Pulse power supply 48 is controlled by lead 43 which is connected to the gas discharge control 49. The volumetric electronic discharge between electrodes 30 and 31 is provided by pulse forming network 44 connected to lead 41 to electrode 31. Pulse forming network 44 is charged by DC supply 46 connected by lead 42. Ground lead 40 is a ground return path to DC power supply 46 and pulse forming network 44 and is connected to electrode 30 and to the gas discharge control 49. Gas discharge control 49 initiates the sequence for each volumetric electronic discharge by initiating the electric arcs through power supply 48 and starting the electrical discharge from the pulse forming network 44.

FIG. 3 shows a cross-section view taken along lines III—III of FIG. 2B. The electrodes 30 and 31 are 50 centimeters long and are spaced two centimeters apart. Mirror 61 is coated with a dielectric and has a 99.8 reflectivity. The radius of curvature is two meters. Mirror 62 is flat with a 99.5 percent reflectivity used as an output mirror. Mirrors 61 and 62 are located within the gas enclosure 20 to eliminate window losses.

An important element in the operation of this invention is the volumetric electrical discharge in the laser medium 19 containing $CF_3I$ gas. $CF_3I$ has a large cross-section for attachment of electrons to form negative ions. Discharges in attaching gases have a tendency to constrict into filamentary arcs, eliminating the desired uniform volumetric character of the electrical discharge. Electrical discharges in $CF_3I$ and $N_2$ were obtained over the range of parameters given in Table 1.

TABLE 1
PARAMETER RANGE FOR SELF-SUSTAINED DISCHARGE STUDIES

| Fixed Parameters | | |
|---|---|---|
| Electrode Area | 2 × 50 | cm |
| Electrode Spacing | 2.0 | cm |
| Pulse Forming Network Capacitance | 20 | nF |
| Variable Parameters | | |
| $N_2$ Pressure | 40–300 | Torr |
| $CF_3I$ Pressure | 0.01–1.5 | Torr |
| DC Power Supply Voltage | 10–35 | kV |

The upper and lower values of N₂ pressure and the upper value of CF₃I pressure were determined by the onset of arcing.

The volumetric electrical discharge for exciting the gas mixture to form an active laser medium may be a self-sustained electrical discharge, or an auxiliary sustained electrical discharge. An embodiment using the self-sustained electrical discharge is shown in FIG. 2B. Pulse power supply 48 provides electrical arcs from the row of resistors 35 and 37 to electrode 30. The arcs are a source of ultraviolet radiation which provides initiatory electrons in laser medium 19. The initiatory electrons may also be provided by a corona source, X-rays, or a high energy electron beam, which sources may be applied through one of the electrodes by means of a suitable transmitting window or from the edge of the electrodes in the space between the electrodes. The laser medium 19 with a source of initiatory electrons or free electrons distributed volumetrically throughout laser medium 19 may be excited by a volumetric electrical discharge across electrodes 31 and 30 by the energy supplied by pulse forming network 44 to lead 41. The presence of the initiatory electrons or free electrons aid in providing a volumetric electrical discharge across electrodes 31 and 30 and reduces the possibility of arcs between electrodes 31 and 30 occurring during the initial stages of the electronic discharge. Pulse forming network 44 provides sufficient voltage across electrodes 31 and 30 to provide additional electrons in the volume discharge by ionization of the laser medium. The ionization is sufficient to supply to the laser medium 19 a continuous source of free electrons to sustain the volumetric electrical discharge.

A volumetric electrical discharge may be obtained where initiatory electrons are supplied in the laser medium to facilitate a uniform discharge without arcs, and where additionally supplemental electrons are continuously supplied during the discharge to provide free electrons in the discharge. If an auxiliary source of electrons is provided to the laser medium, the voltage supplied across the electrodes of the discharge may be reduced below the minimum voltage required to maintain a self-sustained electronic discharge. The lower voltage across the electrodes may provide for a more stable excitation of the laser medium with less tendency for arc formation. The voltage across the electrodes supplies a sustainer electric field which is insufficient to supply large quantities of electrons by ionization. The auxiliary source of electrons to the laser medium, if removed, may terminate the volumetric electrical discharge. The auxiliary source of electrons may be supplied by a high energy electron beam (E.B.), a source of corona, X-rays or a source of ultraviolet radiation.

Figure 5:
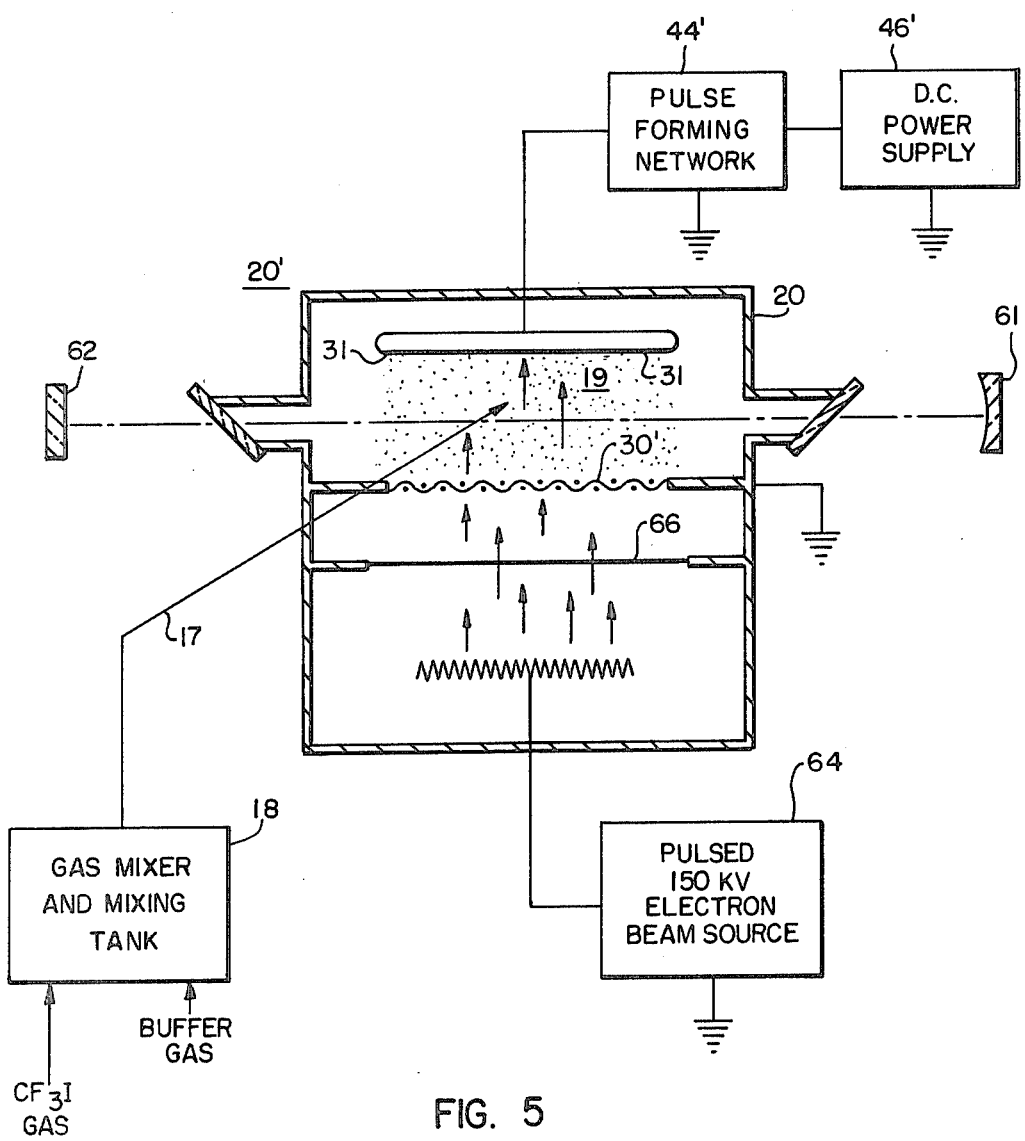
FIG. 5 is a schematic of the cross-section of a laser with electron beam sustained discharge.

A schematic embodiment using an electron beam to provide free electrons in the laser medium to sustain a volumetric electrical discharge is shown in FIG. 5. An electron beam source 64 supplies a beam of electrons with current densities, $J_b$, up to 20 milliamperes per square centimeter through electron beam window 66 and electrode 30' to the laser medium 19 supplied from gas mixer 18 and flowing in a direction perpendicular to the plane of the drawing. Electron beam window 66 may be a 1 mil aluminum foil over an area of 15 centimeters by 2.5 centimeters. The electrode 30' may be a mesh or screen with 60 percent open area with an area equal to that of the electron beam window and located 2.5 centimeters above the beam window 66. The pulse forming network 44' may consist of a bank of 12 kV 20 microfarad capacitors connected in series to provide a 2 microfarad capacitor with operation up to 30 kilovolts. A high pressure spark gap may be used to apply the sustainer voltage to electrode 31'. A charging resistor may be connected between the capacitor and a DC power supply for charging the pulse forming network. A volumetric electrical discharge sustained by the electron beam may be obtained over a wide range of CF₃I pressure and nitrogen pressure. Table 2 shows a range of parameters which may be used to obtain a volumetric electrical discharge using the electron beam to supply free electrons in the laser medium 19.

TABLE 2
PARAMETER RANGE FOR ELECTRON BEAM DISCHARGE EXPERIMENTS

| Fixed Parameters | | |
|---|---|---|
| E.B. Voltage | 140 | kV |
| E.B. Window | Al 1.0 | mil |
| E.B. Window Area | 15 × 2.5 | cm |
| Discharge Area | 15 × 2.5 | cm |
| Electrode Spacing | 2.5 | cm |
| Variable Parameters | | |
| N₂ Pressure | 150–210 | Torr |
| CF₃I Pressure | 0.5–2.0 | Torr |
| DC Supply Voltage | 6–12 | kV |
| Pulse Length | 10–50 | μ sec |
| E.B. Current | 80–800 | mA |
| Derived Parameters | | |
| E/N | $2.2-6.5 \times 10^{-16}$ | V-cm² |
| $J_b$ | 2–20 | mA/cm² |

Similar electron beam sustained discharges were obtained using the gas argon in place of nitrogen. These parameters are not necessarily restrictive but rather reflect the range of parameters which have been investigated. The range in parameters may reflect the limits due to the onset of arcing which channels the electron energy to narrow streams and away from a volumetric electronic discharge.

Figure 6:
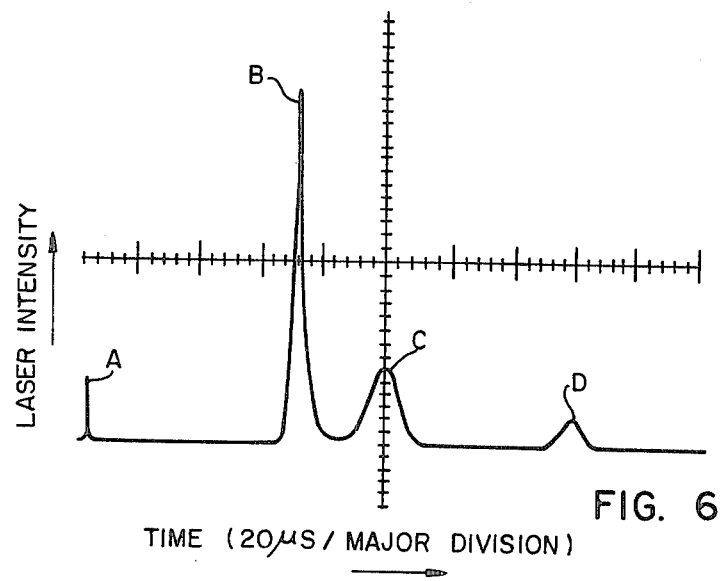
FIG. 6 is a curve showing laser output on the $I(^2P_{\frac{1}{2}}) \rightarrow I(^2P_{3/2})$ transition at 1.32 μm as a function of time from the apparatus as shown in FIG. 2B.

An example of laser emission that may be obtained from the embodiment of the invention as shown in FIG. 2B is shown in FIG. 6. In FIG. 6 at curve portion B, C and D, the laser emission is on the $I(^2P_{\frac{1}{2}}) \rightarrow I(^2P_{3/2})$ transition at 1.32 micrometers from a CF₃I-N₂ discharge, with the partial pressure of CF₃I equal to 0.18 Torr, the partial pressure of nitrogen being 70 Torr and the current density J equal to 32 amps per square centimeter. The initial pulse at curve portion A in FIG. 6 is a N₂ laser line emitted during the excitation pulse. The duration of the discharge is approximately 0.5 microseconds. The delay of 70 microseconds from the time of electrical discharge to stimulated emission of radiation at curve portion B is believed to be due to the time for a population inversion to occur due to a more rapid decay of the ground state of iodine than the decay of the excited state of iodine. The curve portions C and D illustrate subsequent laser output arising from relaxation oscillations in the laser population inversion.

Figure 7:
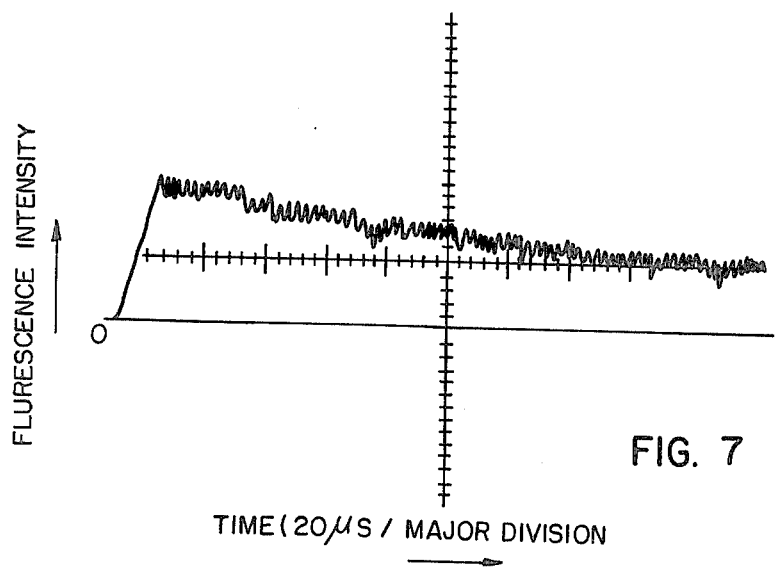
FIG. 7 is a curve showing fluorescent emission as a function of time on the $I(^2P_{\frac{1}{2}}) \rightarrow I(^2P_{3/2})$ transition at 1.32 μm from the apparatus as shown in FIG. 2B.
Figure 8A:
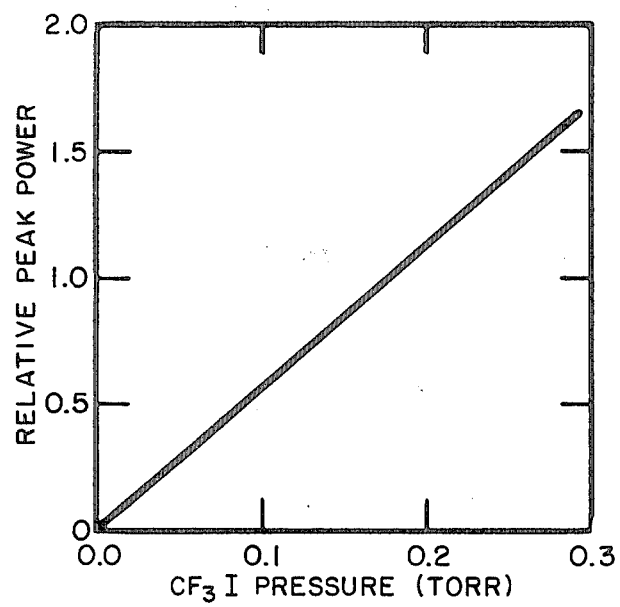
FIG. 8A is a curve showing the variation of laser intensity as a function of $CF_3I$ pressure with constant nitrogen pressure of 70 Torr.
Figure 8C:
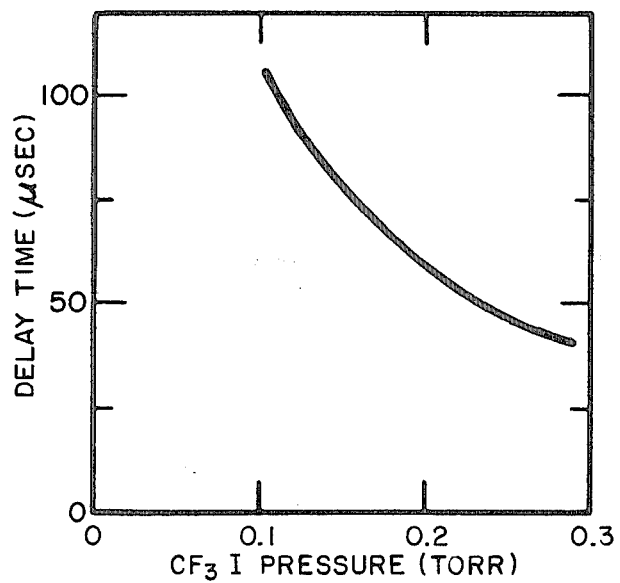
FIG. 8C is a curve showing the variation in delay time to the onset of lasing as a function of $CF_3I$ pressure with a constant nitrogen pressure of 70 Torr.
Figure 8B:
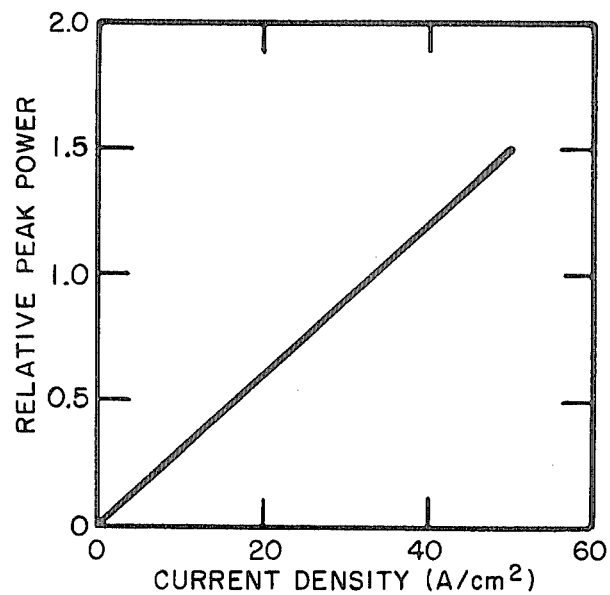
FIG. 8B is a curve showing the variation of laser intensity as a function of peak discharge.
Figure 8D:
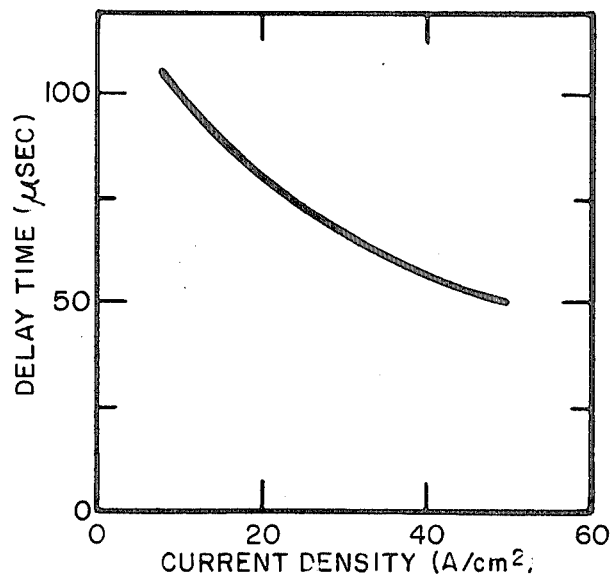
FIG. 8D is a curve showing the variation in delay time to the onset of lasing as a function of peak discharge current density with constant $CF_3I$ pressure of 0.18 Torr and nitrogen pressure of 70 Torr.

The delay curve in the excited iodine is shown in FIG. 7. The decay is shown by the fluorescence emission from the $I(^2P_{\frac{1}{2}})$ to the $I(^2P_{3/2})$ transition with the parameters the same as those in FIG. 6. FIGS. 8A, B, C and D show the variation of laser intensity and delay time to the onset of lasing from the time of the volumetric electrical discharge as a function of CF₃I pressure and peak discharge current density. FIGS. 8A and 8C are curves taken over a pressure variation with the discharge current constant at 32 amps per square centimeter. FIGS. 8B and 8D show a curve with current density variation taken with a constant pressure of 0.18 Torr of $CF_3I$. The nitrogen pressure was 70 Torr in FIGS. 8A through 8D. The embodiment of the apparatus used to obtain this data is that shown in FIG. 2B.

I claim:

1. Laser apparatus comprising:
   an enclosure;
   a gas in said enclosure comprising an inert buffer gas and an active gas having the formula $C_nY_{2n+1}X$, wherein Y is H or F, X is either I or Br and n is 1, 2, 3 or 4;
   spaced apart electrode means defining a volume discharge region therebetween;
   means for producing a flow of said gas through said volume discharge region;
   means for exciting said gas by producing electrons to collide with the molecules of said active gas to produce electrically excited atomic iodine or bromine;
   said means for exciting said gas including;
   (1) means for providing free electrons to the volume discharge region both prior to and during a volumetric electrical discharge; and
   (2) pulse dc excitation means operably connected to said spaced apart electrodes to produce a volumetric electrical discharge across said electrode to excite said gas; and
   means for producing stimulated emission of radiation from said gas.

2. The laser of claim 1 wherein said means for providing free electrons to said volume discharge region include an electron beam source.

3. The laser of claim 1 wherein said means for supplying free electrons to said volume discharge region includes a source of ultraviolet radiation.

4. The laser of claim 1 wherein said means for supplying free electrons produces said free electrons in response to pulse dc excitation from said pulse dc excitation means.

5. A method for producing a lasing transition between the $^2P_{\frac{1}{2}}$ and $^2P_{3/2}$ energy levels of the ground electronic states of atomic iodine or atomic bromine in an enclosure containing a gas flowing through a volume discharge region defined between spaced apart electrodes, said gas comprising an inert buffer gas and an active gas having the formula $C_nY_{n+1}X$, wherein Y is H or F, X is either I or Br and n is 1, 2, 3 or 4, comprising the steps of:
   flowing said gas through the volume discharge region defined between said electrodes,
   introducing free electrons into said volume discharge region both prior to and during a volumetric electrical discharge,
   exciting said gas in response to a volumetric electrical discharge in said volume discharge region by impact collision between free electrons and the molecules of said active gas to produce electrically excited atomic iodine or bromine; and
   producing stimulated emission of radiation from said gas.

6. A laser apparatus comprising:
   an enclosure;
   an atomic iodine laser gas in said enclosure;
   spaced apart electrode means defining a volume discharge region therebetween;
   means for flowing said laser gas through said volume discharge region;
   means for supplying free electrons into said volume discharge region both prior to and during a volumetric electrical discharge;
   pulse dc excitation means operably connected to said spaced apart electrode means to produce a volumetric electrical discharge in said volume discharge region causing electrons to collide with the molecules of said atomic iodine laser gas to produce electrical excited atomic iodine; and
   means for producing stimulated emission of radiation from said atomic iodine laser gas.

7. A laser apparatus comprising:
   an enclosure;
   an atomic bromine laser gas in said enclosure;
   spaced apart electrode means defining a volume discharge region therebetween;
   means for flowing said laser gas through said volume discharge region;
   means for supplying free electrons into said volume discharge region both prior to and during a volumetric electrical discharge;
   pulse dc excitation means operably connected to said spaced apart electrode means to produce a volumetric electrical discharge in said volume discharge region causing electrons to collide with the molecules of said atomic bromine laser gas to produce electrical excited atomic bromine; and
   means for producing stimulated emission of radiation from said atomic bromine laser gas.

8. A method for producing stimulated emission of radiation from an atomic iodine laser gas medium based on the electrical dissociation of excited iodine molecules, comprising the steps of:
   flowing an atomic iodine laser gas composition through a volume discharge region defined between spaced apart electrodes,
   supplying free electrons to said volume discharge region before initiating a volumetric electrical discharge,
   applying pulse dc electrical excitation to said electrodes to initiate a volumetric electrical discharge,
   continually supplying free electrons to said volume discharge region during said volumetric electrical discharge,
   exciting the iodine molecules by collision between the free electrons and the iodine molecules during said volumetric electrical discharge, the excited iodine molecules subsequently dissociating to form excited iodine; and
   producing stimulated emission of radiation from said atomic iodine laser gas medium.

9. A method for producing stimulated emission of radiation from an atomic bromine laser gas medium based on the electrical dissociation of excited bromine molecules, comprising the steps of:
   flowing an atomic bromine laser gas composition through a volume discharge region defined between spaced apart electrodes,
   supplying free electrons to said volume discharge region before initiating a volumetric electrical discharge,
   applying pulse dc electrical excitation to said electrodes to initiate a volumetric electrical discharge,
   continually supplying free electrons to said volume discharge region during said volumetric electrical discharge,
   exciting the bromine molecules by collision between the free electrons and the bromine molecules during said volumetric electrical discharge, the excited bromine molecules subsequently dissociating to form excited bromine; and
   producing stimulated emission of radiation from said atomic bromine laser gas medium.

* * * * *